(12) United States Patent
Marks et al.

(10) Patent No.: US 9,507,129 B2
(45) Date of Patent: Nov. 29, 2016

(54) APPARATUS COMPRISING A COMPACT CATADIOPTRIC TELESCOPE

(71) Applicant: Duke University, Durham, NC (US)

(72) Inventors: Daniel Marks, Durham, NC (US); David Jones Brady, Durham, NC (US); Nathan Adrian Hagen, Durham, NC (US)

(73) Assignee: Duke University, Durham, NC (US)

( * ) Notice: Subject to any disclaimer, the term of this patent is extended or adjusted under 35 U.S.C. 154(b) by 36 days.

(21) Appl. No.: 14/580,001

(22) Filed: Dec. 22, 2014

(65) Prior Publication Data

US 2015/0177496 A1      Jun. 25, 2015

Related U.S. Application Data

(60) Provisional application No. 61/918,788, filed on Dec. 20, 2013.

(51) Int. Cl.
| | |
|---|---|
| G02B 13/00 | (2006.01) |
| G02B 17/08 | (2006.01) |
| H04N 5/225 | (2006.01) |
| G02B 23/06 | (2006.01) |

(52) U.S. Cl.
CPC ....... *G02B 13/0065* (2013.01); *G02B 17/0808* (2013.01); *G02B 17/0856* (2013.01); *G02B 23/06* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 6,449,103 | B1 * | 9/2002 | Charles ................. | G02B 13/06 359/366 |
| 2004/0080938 | A1 * | 4/2004 | Holman ................... | F21S 8/08 362/231 |
| 2004/0228008 | A1 * | 11/2004 | Hill ...................... | G02B 21/0056 359/727 |
| 2006/0050386 | A1 * | 3/2006 | Kuthirummal ........ | G02B 17/00 359/471 |
| 2010/0171866 | A1 * | 7/2010 | Brady .................. | G02B 3/0056 348/340 |
| 2010/0309566 | A1 * | 12/2010 | DeWitt ................. | G02B 5/001 359/729 |
| 2012/0063000 | A1 * | 3/2012 | Batchko ................. | G02B 3/14 359/666 |
| 2014/0111608 | A1 * | 4/2014 | Pfeil ................. | H04N 5/23238 348/37 |
| 2015/0177496 | A1 * | 6/2015 | Marks ............... | G02B 13/0065 348/335 |

* cited by examiner

*Primary Examiner* — Shahbaz Nazrul
(74) *Attorney, Agent, or Firm* — Kaplan Breyer Schwarz & Ottesen, LLP (57) ABSTRACT

A camera system for a mobile device includes an array of compact catadioptric telescopes wherein at least some of the telescopes have a portion of their aperture truncated. At least some of the catadioptric telescopes in the array are tilted with respect to the system optical axis.

21 Claims, 9 Drawing Sheets

APPARATUS COMPRISING A COMPACT CATADIOPTRIC TELESCOPE

CROSS REFERENCE TO RELATED APPLICATIONS

This case priority of U.S. Pat. Appl. 61/918,788, which was filed Dec. 20, 2013 and is incorporated herein by reference. This case is related to U.S. patent application Ser. No. 14/068,708, filed Oct. 31, 2013, which is incorporated herein by reference.

STATEMENT REGARDING FEDERALLY-SPONSORED RESEARCH

This invention was made with Government support under grant number NBCHC090032 awarded by the Defense Advanced Research Projects Agency (DARPA). The Government has certain rights in the invention.

FIELD OF THE INVENTION

The present invention relates to imaging optics in general, and, more particularly, to camera optics for use in cell phones.

BACKGROUND OF THE INVENTION

Over the past decade, integration of cameras with mobile devices has become increasingly common. The desired thickness for tablets and cell phones is typically less than 1 centimeter (cm) and as thin as about 5 millimeters (mm). Since the ideal camera integrated into such devices images normal to the device surface, camera thickness is subject to stringent constraints and is, in fact, a critical metric. That is, very low profile optics are required.

Market pressures dictate that a mobile-device camera provides a large field-of-view and high resolution. These requirements are, unfortunately, at odds with one another. In particular, a large field-of-view produces large off-axis aberrations that must be corrected. And to achieve high resolution, a minimal-size entrance pupil is required to achieve a particular angular resolution. As the number of pixels grows, more optical elements are required to correct these aberrations, which both become larger laterally because the entrance pupil size increases. Furthermore, the axial length of the camera increases to accommodate the increasing number of elements.

Mobile-phone cameras are purely refractive and have an entrance pupil of 2 mm or less in diameter. This limits the angular resolution to 0.015 degrees or greater, so that, for example, for a 70×42 degree field-of-view camera, there are at best 14 million resolvable pixels if the diffraction limit is achieved over the entire field.

To improve this performance, a wide entrance pupil is needed, which requires wider optics as well as a longer optical-train length.

SUMMARY OF THE INVENTION

The present invention provides an optics systems system having a wide field-of-view and that is flat enough for use in a mobile device, such as a smartphone.

In accordance with an illustrative embodiment of the invention, an array of compact catadioptric (refractive and reflective) optics is used to provide a camera for a mobile device (e.g., smartphone, etc.). The present inventors recognized that a catadioptric design is well suited for such service because the beam path through such optics is "folded," thereby enabling a reduced profile or thickness for the optics. In the illustrative embodiment, the catadioptric optics are implemented as an array of Schmidt-Cassegrain telescopes, which, as a consequence of the two reflections that occur in each telescope, enable an optical path or train that is up to three times longer than the physical thickness of the telescope.

Each compact telescope in the array can have a relatively moderate field-of-view (c.a., 25 degrees). To increase the field-of-view, the axis of each of the telescopes in the array is tilted with respect to that of other telescopes and oriented so that neighboring micro-cameras have overlapping fields-of-view. Such overlapping facilitates computationally stitching a single composite image from the data taken obtained from the many micro-cameras in the array.

In addition to enabling intrinsically thinner lenses, a relatively narrower field-of-view simplifies lens and mechanism design for focal adjustment, enabling a yet thinner lens assembly.

In some embodiments, a further reduction in camera thickness is achieved by limiting the spectral regard of each micro-camera, thereby reducing the need for chromatic aberration correction to enable a thinner lens design. Removing the need for on-chip spectral filtering enables a larger numerical aperture at the pixel, which again enables a thinner lens assembly. Full spectral imaging is achieved by stitching data together from overlapping micro-camera fields. Such overlaps are required for effective stitching, but with spectrally diverse micro-cameras, each field point should be observed by three micro-cameras.

It is notable that the angular resolution need not be equal in all micro-cameras, that the focal state need not be the same and that exposure values, frame sampling phase and frame rate may vary from one micro-camera in the array to the next, enabling efficient spectral-imaging synthesis, exposure and focal stacking, increased dynamic range in the stitched image and system power management. An example of the use of frame-rate variation for video compression in the prior art is given in Mohan Shankar, Nikos P. Pitsianis, and David J. Brady, "Compressive video sensors using multichannel imagers," Appl. Opt. 49, B9-B17 (2010).

Since the telescopes used in embodiments of the invention are wider than they are deep, their profile (i.e., height) increases when tilted. As previously discussed, any increase in apparent camera thickness is potentially quite problematic in mobile device applications. The inventors recognized that only a partial aperture of each telescope is required to produce the required resolution. In other words, a portion of the aperture of the telescope can be removed. As a consequence, when tilted, the profile of such a partial-aperture telescope is reduced relative to that of a full-aperture telescope. In some embodiments, almost half of the lens is removed.

In some embodiments, the portion of the aperture removed reduces the profile of "tilted" partial-aperture telescopes sufficiently so that they fit within a mobile device. Regions that suffer a resolution reduction due to partial removal of the aperture are imaged by another partial-aperture telescope that provides better resolution in that region.

In addition to the foregoing, some embodiments of the optics system include at least one and typically more of the following benefits:
 The same material is used for both the converging and diverging elements, enabling the optics to achromatize itself. Since there are relatively few optical plastics available, this is very advantageous.

The optical train and aperture of each catadioptric telescope is relatively large and flat. Therefore, tilting the camera and slicing it does not remove elements as it otherwise would if the optics included a relatively long narrow optical train of many elements. Rather, slicing the catadioptric telescopes used in conjunction with the illustrative embodiment simply reduces the aperture thereof.

The bokeh (defocused pattern) is highly structured since the aperture is highly structured. As a consequence, the bokeh can be used to infer the amount of defocus and obtain three-dimensional information about the scene from a single image.

Individual catadioptric telescopes in the array can differ from one another in terms of focus, exposure, shutter speed, and the like, thereby enabling high dynamic range and high depth-of-field for the optics. These telescopes can be adjusted independently and dynamically, unlike prior-art lens arrays for use with cameras.

DETAILED DESCRIPTION

In accordance with the present teachings, a camera system intended for use in mobile devices includes an array of miniature cameras, each comprising a compact catadioptric telescope. Consistent with the usage presented in U.S. Pat. No. 8,259,212, which is incorporated by reference herein, each camera in the array is referred to as a "micro-camera." As used herein and in the appended claims, the term "compact telescope" or "compact catadioptric telescope" refers to a telescope having a thickness of 10 mm or less.

Figure 1:
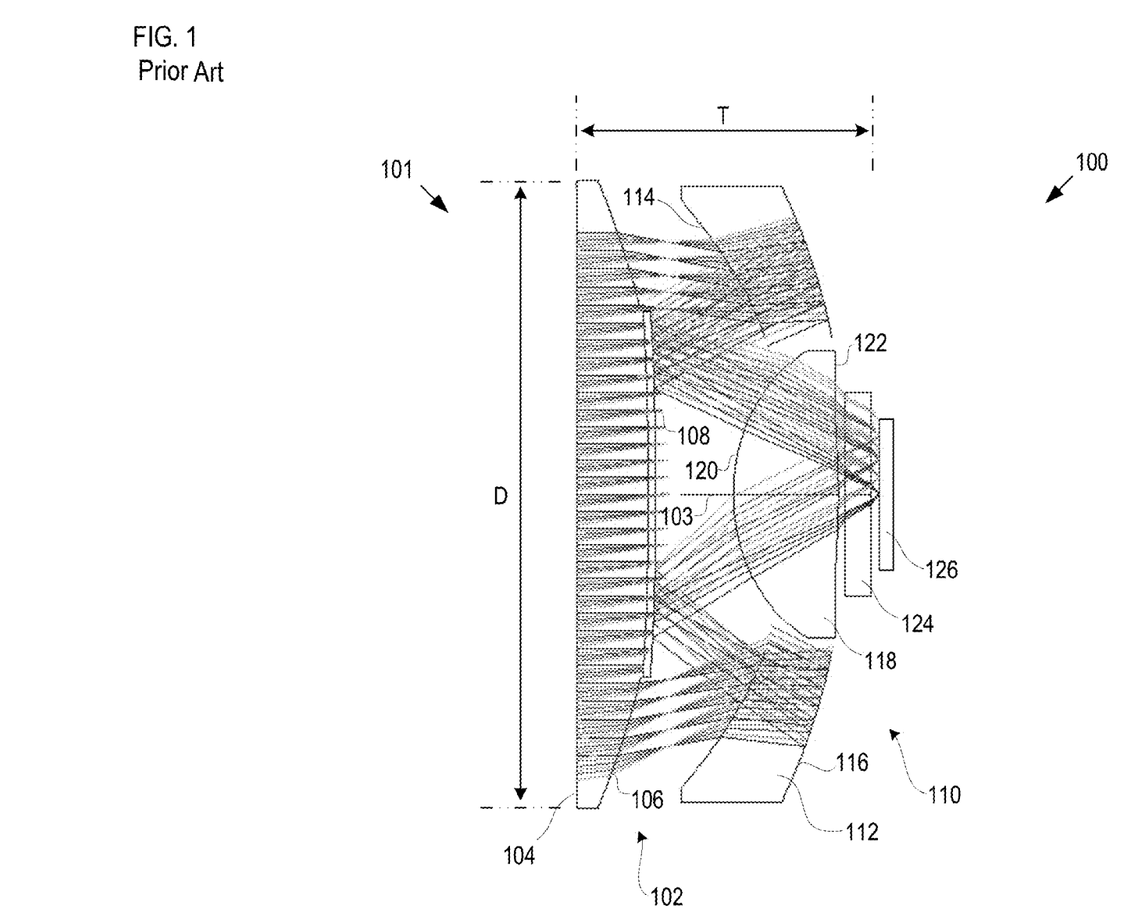
FIG. 1 depicts a schematic drawing of a cross-sectional view of a catadioptric telescopic including ray tracings.

FIG. 1 depicts prior-art camera 100, which includes telescope 101 and focal plane array 126. Telescope 101, which employs catadioptric optics, was developed by some of the present inventors for a different application. See, Marks et al., "Wide-field Compact Catadioptric Telescope Spanning 0.7 to 14 µm Wavelengths," Applied Optics, V52(18), pp. 4334-4342 (Jun. 20, 2013), incorporated by reference herein. These inventors recognized that a suitably modified version of telescope 101 could be used to great advantage in a camera for mobile devices.

The particular catadioptric telescope depicted in FIG. 1 is a Schmidt-Cassegrain telescope, although modified by the inclusion of a Mangin mirror. As will be appreciated by those skilled in the art, the presence of the Mangin mirror provides additional chromatic aberration control to achieve a field much wider than a typical Cassegrain telescope.

Telescope 101, having optical axis 103, includes front optical element 102 and rear optical element 110, which comprises annular portion 112 and central portion 118.

In the illustrative embodiment, front optical element 102 is a Schmidt corrector. A Schmidt corrector is an aspheric lens that corrects the paths of light rays such that the light reflected from the outer part of the objective lens and light reflected from the inner portion of the objective lens is brought to the same focus.

In the illustrative embodiment, annular portion 112 of rear optical element 110 is a Mangin mirror. A Mangin mirror is a negative meniscus lens with the reflective surface on the rear side of the glass forming a curved mirror that reflects light without spherical aberration. Central portion 118 is a field flattener, which removes astigmatism and field curvature.

Front optical element 102 has power and rear optical element 110 has negative power, the latter canceling the positive power of the front optical element. In some embodiments, optical elements 102 and 110 are made from the same material, such that the dispersion of these elements cancel and the chromatic aberration is greatly reduced. Typically, chromatic invariance is usually achieved using multiple materials, such as a flint and crown glass. The "self-cancelling" property of the dispersion between the elements, in accordance with embodiments of the invention, enables use a single material in telescope 100. Most of the power is provide by reflective elements, with the refractive elements providing a small amount of chromatic control.

Each of optical elements 102 and 110 has two sides, one of which is closer to the object/scene being imaged and the other being further therefrom. Except for planar front surface 104 of front optical element 102, each side of each element includes two optical surfaces: a center circular optical surface and an outer annular optical surface. In particular:

Back side of element 102: includes annular optical surface 106 and the center circular optical surface 108;
Front surface of rear optical element 110: includes annular optical surface 114 and the center circular optical surface 120;
Rear surface of rear optical element 110: includes annular optical surface 116 and center circular optical surface 122.

Catadioptric telescope 101 therefore includes seven optical surfaces, three of which are on front optical element 102 and four of which are on rear optical element 110. As used in this disclosure and the appended claims, the term "optical surface" means a surface that refracts or reflects light.

FIG. 1 also depicts a ray trace for telescope 101 showing the path of light rays from an object (not depicted) to an image thereof. Specifically:

1. Light rays are propagated from an object/scene and are received by and refracted through surface 104, the planar front surface of front optical element 102.
2. The rays are then refracted by surface 106, the backside annular surface of front optical element 102.
3. The rays are then refracted through surface 114, the front annular surface of rear optical element 110.
4. The rays are next reflected from surface 116 (the primary mirror), the backside annular surface of rear optical element 110.
5. The rays are then refracted, once again, through surface 114, the front annular surface of rear optical element 110.
6. The rays are next reflected from surface 108 (the secondary mirror), the backside central surface of front optical element 102.
7. The rays are then refracted by field flattener 118, as formed by surfaces 120 and 122, the respective front and backside central surfaces of rear optical element 110.
8. The rays are then propagated through sensor window 124.
9. The rays form an image on the sensor (i.e., focal plane array 126). The focal plane array is conventional array of image sensors (e.g., CMOS sensors, CCD elements, infrared light photodetectors, etc.) that converts the received light into a digital representation of the imaged scene.

Example

In an example design of catadioptric telescope 101, diameter D, of front optical element 102 (and hence telescope 101) is 9.2 mm and thickness T of telescope 100 is 4.5 mm. The entrance pupil of telescope 101 is 8 mm and the focal length is 5 mm. Telescope 101 images from −12.5 to 12.5 degrees off-axis, with design wavelengths in the range of 486 to 656 nanometers (nm).

Field flattener 118 removes astigmatism and field curvature, so that the example design achieves an f/# of 0.6. The effective f/# for illumination varies from 1.0 at the center to 1.2 at the edge thereof. As a consequence, this design of telescope 101 can operate sufficiently in conditions of low-light where most mobile-phone cameras operate poorly.

The image field is 2.2 mm in diameter; it is designed for a 0.001 mm pixel CMOS sensor (an implementation of focal plane array 126). This is consistent with the recent generation of CMOS backside-illuminated sensors. The instantaneous field-of-view is 40 arcsec.

The limiting aberration of telescope 101 is lateral chromatic aberration, which may be corrected digitally, if desired, in some embodiments. Telescope 101 can be translated by a distance of 0.031 mm to focus from infinity to 60 cm distance. This is within the range of the stroke of a piezoelectric element, so that it may be used instead of a static power-consuming voice-coil actuator.

Figure 2A:
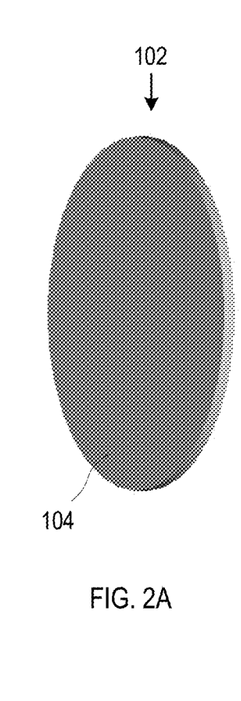
FIGS. 2A and 2B depict respective front and back views of a scale, solid model of the front optical element of the catadioptric telescope of FIG. 1.
Figure 2B:
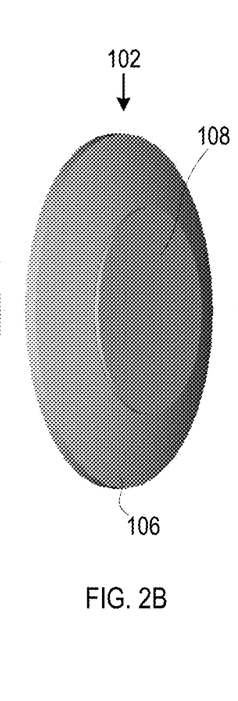

FIGS. 2A and 2B depict respective front and back views of a scale, solid model of front optical element 102. FIG. 2A depicts planar front surface 104 of front optical element 102. FIG. 2B depicts backside annular surface 106 and backside central surface 108 (the secondary mirror) of front optical element 102.

Figure 2C:
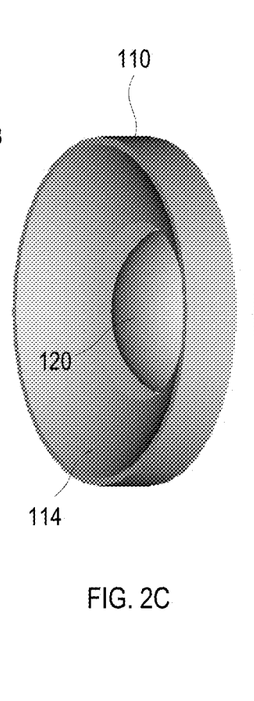
FIGS. 2C and 2D depict respective front and back views of a scale, solid model of the rear optical element of the catadioptric telescope of FIG. 1.
Figure 2D:
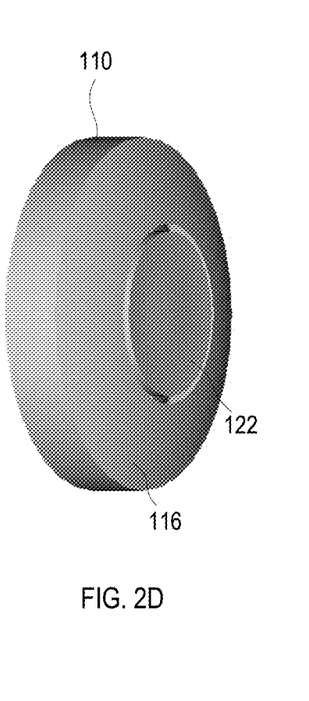

FIGS. 2C and 2D depict respective front and back views of a scale, solid model of rear optical element 110. FIG. 2C depicts front annular surface 114 and front central surface 120 of rear optical element 110. FIG. 2D depicts rear annular surface 116 (the primary mirror) and backside central surface 122 of rear optical element 110.

In some embodiments, front optical element 102 and rear optical element 110 are molded out of a plastic, such as E48R, available from Zeonex, Louisville, Ky. A highly reflective coating (e.g., aluminum, etc.) is deposited onto appropriate parts of the plastic to provide "mirror" surfaces.

In some embodiments, a small region (c.a. 0.2 to 0.3 mm wide) at the transition zones between the inner and outer surfaces of front optical element 102 and rear optical element 110 are blackened (not depicted) to reduce stray light scattering (from these transition zones). In some embodiments, front optical element 102 and rear optical element 110 are molded with mating features (not depicted). The mating features serve as an alignment feature and also simplify the process of attaching/bonding these elements to one another. Using such mating features obviate difficult active-alignment steps.

Furthermore, because, in such embodiments, elements 102 and 110 are made of identical materials, the thermal expansion properties are the same and therefore the bonded components are likely to have far less image degradation due to thermal expansion as all dimensions scale together with temperature.

Figure 3A:
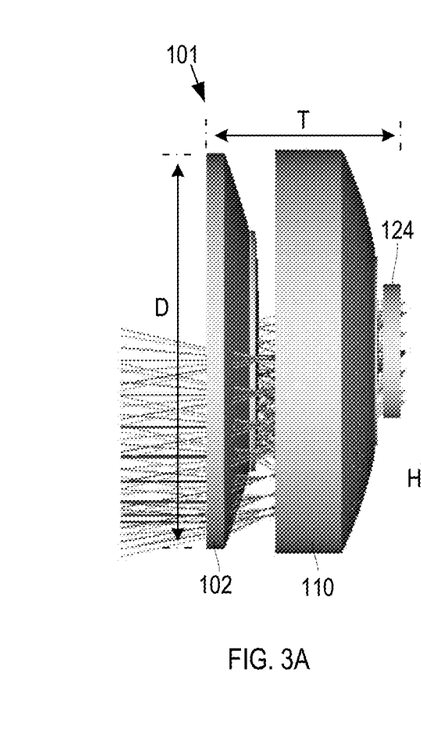
FIG. 3A depicts a side view of a solid model of the catadioptric telescope of FIG. 1.
Figure 3B:
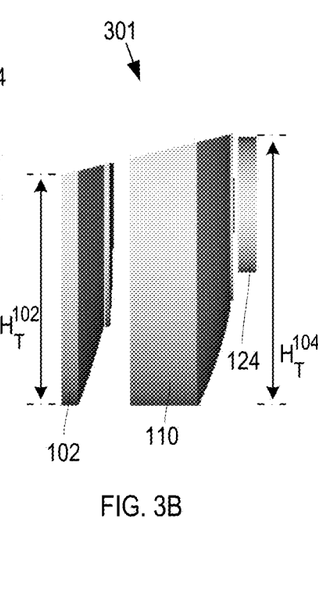
FIG. 3B depicts a side view of a truncated catadioptric telescope formed by removing portions of telescope of FIG. 3A, in accordance with the illustrative embodiment.
Figure 3C:
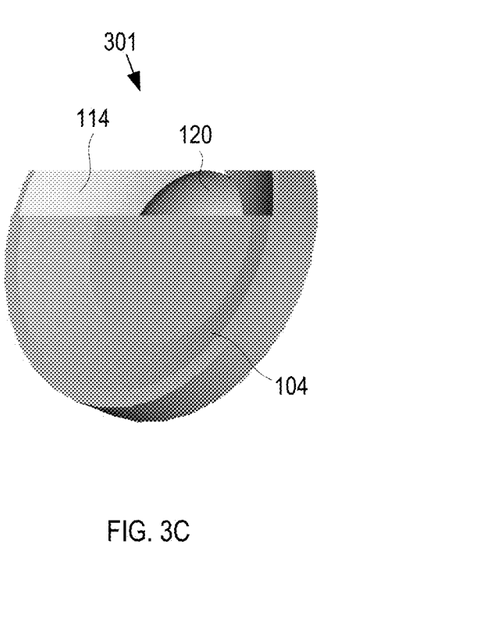
FIG. 3C depicts a front view of truncated catadioptric telescope of FIG. 3B.

FIGS. 3B and 3C depict, via respective front and side views, truncated catadioptric telescope 301. FIG. 3A provides, for comparison, catadioptric telescope 101, in which no portion of the aperture of the telescope is removed.

As previously discussed, to provide an adequate field-of-view, catadioptric telescopes in an array thereof are tilted so that they each provide a different field-of-view. Those fields-of-view are "stitched" together to provide a composite image. But tilting the telescopes increases their profile (since they are wider than they are deep). The use of truncated catadioptric telescopes 301 facilitates such tilting; that is, the truncated aperture reduces the profile of each telescope such that the array of micro-cameras has a thickness that is suitable for use in conjunction with mobile devices.

As depicted in FIG. 3A, even if incoming rays from a scene are received at only about half of the aperture of front optical element 102, the full scene is imaged through window 124 onto the focal plane array (not depicted). Therefore, nearly one half of front optical element 102 can be removed. Somewhat less of rear optical element 110 can be removed as is apparent from the ray tracing depicted in FIG. 1.

As used in this disclosure and the appended claims, the term "truncated," when used in conjunction with "telescope" or "catadioptric telescope" means a telescope with a portion of at least its aperture removed. That is, a portion of at least the front optical element (and typically the back optical element as well) is physically removed (not simply "blocked"). In conjunction with the present disclosure, those skilled in the art will be able to determine how much of the aperture of the telescopes can be removed and how to to do so.

By way of example, assume that catadioptric telescope 101 has a diameter D of 9.2 mm and a thickness T of 4.5 mm. Assume that, for truncated catadioptric telescope 301, portions of front optical element 102 and rear optical element 110 are physically removed such that front optical element 102 has a truncated height $H_T^{102}$ of 5.5 mm and rear optical element 110 has a truncated height $H_T^{104}$ of 6.2 mm. The effect of tilting truncating catadioptric telescope 301 is illustrated in FIGS. 4A and 4B.

Figure 4A:
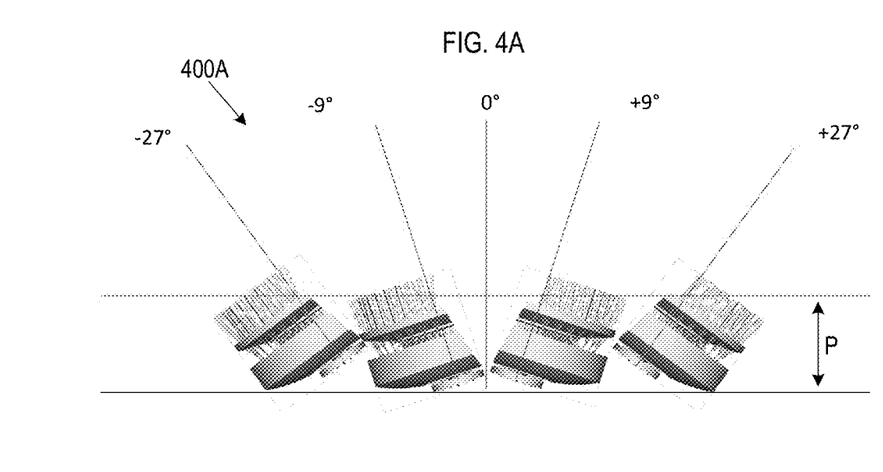
FIG. 4A depicts a first array of truncated catadioptric telescopes in accordance with an illustrative embodiment.

FIG. 4A depicts an array 400A of cameras 300 including truncated catadioptric telescopes 301 (focal plane array not depicted) for use in a mobile device. Although depicted as one-dimensional array for the sake of clarity, in an actual camera system, micro-cameras 300 would be arranged in a two-dimensional array.

In FIG. 4A, the outermost truncated catadioptric telescopes 301 in array 400A are tilted by +27 and −27 degrees, providing array 400A with a field-of-view of 54 degrees. If truncated catadioptric telescopes 301 have the dimensions provided in the above example, profile P increases to 5.5 mm from 4.5 mm as a consequence of the tilt.

Figure 4B:
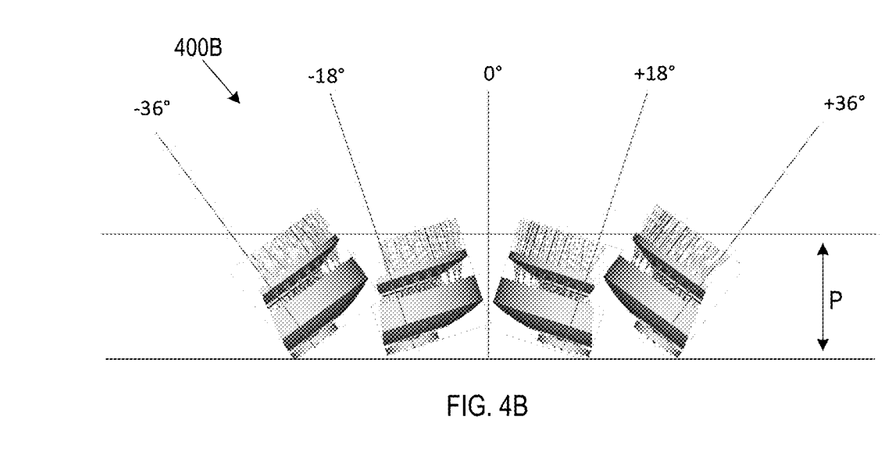
FIG. 4B depicts a second array of truncated catadioptric telescopes in accordance with an illustrative embodiment.

FIG. 4B depicts array 400B of cameras 300 including truncated catadioptric telescopes 301. In FIG. 4B, the outermost truncated catadioptric telescopes 300 in array 400A are tilted by +36 and −36 degrees, providing array 400A with a field-of-view of 72 degrees. If truncated catadioptric telescopes 300 have the dimensions provided in the above example, profile P increases to 7.4 mm from 4.5 mm as a consequence of the tilt.

Figure 5:
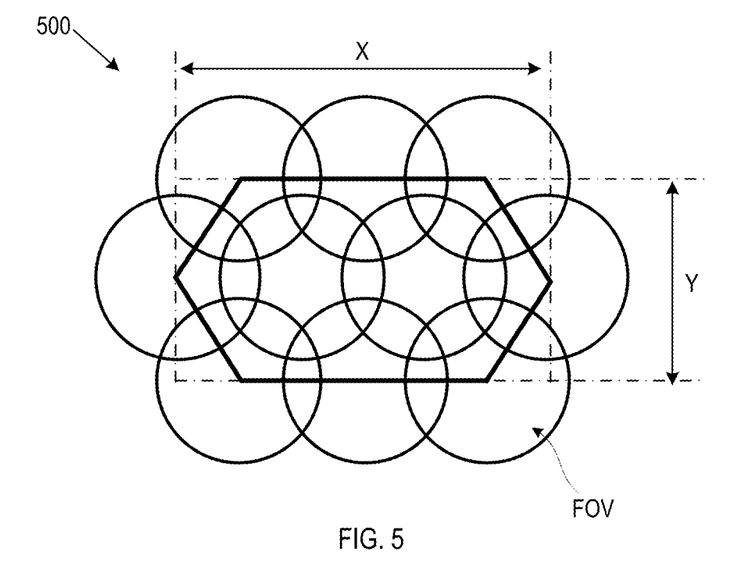
FIG. 5 depicts the field-of-view for each of ten cameras in a two-dimensional array, in accordance with an illustrative arrangement.

FIG. 5 depicts the field-of-view for each of ten cameras in a two-dimensional array 500 in accordance with an illustrative arrangement. Each camera comprises a truncated catadioptric telescopes as previously disclosed. Each circle represents field-of-view FOV for one camera. Each such field-of-view is tilted so the array thereof covers various directions. In some other embodiments, the micro-camera array includes more or fewer than ten cameras, consistent with design goals (e.g., achieving a desired field-of-view, etc.).

Each (micro-) camera in the array propagates the portion of the scene in its field-of-view onto its respective focal-plane array. The focal-plane array associated with each telescope converts the received optical sub-image into a digital sub-image of the portion of the scene. All such digital sub-images are transmitted to a processor. The processor computationally stitches the digital sub-images together via known algorithms, thereby forming a composite digital image of the entire scene.

There is overlap between the fields-of-view FOV to facilitate the stitching process. A hexagonal coverage pattern maximizes overlap and minimizes the number of catadioptric telescopes needed for coverage. Because there is overlap between fields-of-view, as the panorama is acquired, objects are viewed in the overlap regions between telescopes. Parallax in these two regions may be used to infer the range to objects, as well as help remove the parallax artifacts from the stitched panorama.

In an illustrative embodiment, each telescope provides a field-of-view of 24 degrees and the spacing between centers of each telescope is 18 degrees. This provides array 500 with a field-of-view X-Y of 54×31 degrees. The 31 degree field-of-view is calculated as: 18×2×cos(30 deg).

The modulation transfer function for a masked aperture (to simulate a truncated aperture) was calculated. Because symmetry is broken by blocking half of the aperture, separate MTF plots were prepared for the field angles that are inclined in the same direction as the unmasked region, and the field angles that are oppositely inclined. Due to vignetting, the oppositely inclined angles form a better image with a MTF very similar to an unmasked telescope. As a consequence, in preferred embodiments, the apertures are arranged such that oppositely inclined rays point toward the center of the field so that the best resolution is achieved at the field center. This is illustrated in FIGS. 6A and 6B, in a ray trace through telescope 301 of camera 300 is depicted for the aforementioned scenarios.

Figure 6A:
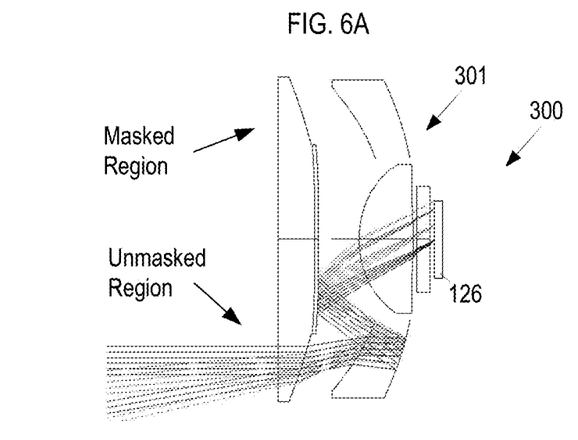
FIG. 6A depicts a ray tracing through a masked catadioptric telescope wherein light rays arrive at the telescope in the same direction as the unmasked region.
Figure 6B:
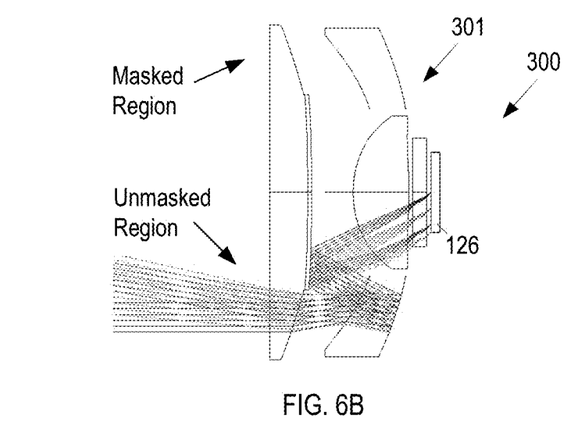
FIG. 6B depicts a ray tracing through a masked catadioptric telescope wherein the light rays arrive at the telescope in the opposite direction as the unmasked region.

FIG. 6A depicts the scenario in which light rays arrive at the masked catadioptric telescope (equivalent to truncated catadioptric telescope 301) in the same direction as the unmasked region (same direction as image point position). FIG. 6B depicts the situation in which rays arrive at the telescope in the opposite direction as the unmasked region (opposite direction as image point position).

Figure 7A:
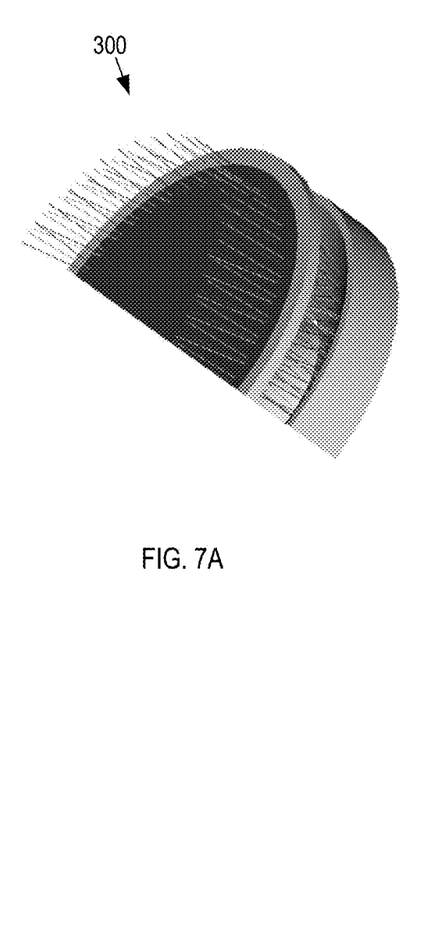
FIG. 7A depicts the semicircular annular aperture of a truncated catadioptric telescope in accordance with the illustrative embodiment.
Figure 7B:
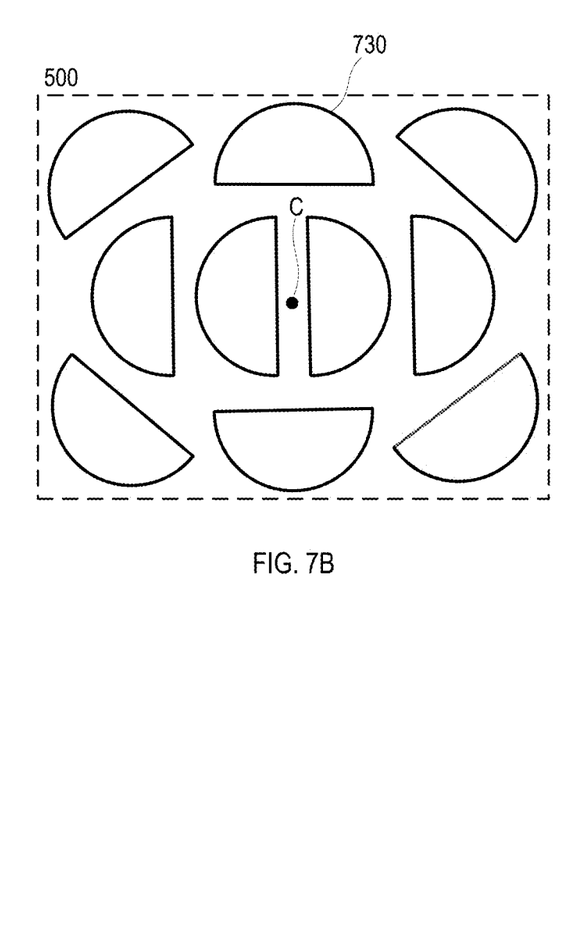
FIG. 7B depicts an arrangement of micro-cameras in an array thereof, showing the orientation of the truncated apertures of each of the micro-cameras.

FIG. 7A depicts the semicircular annular aperture of truncated catadioptric telescope 301. FIG. 7B depicts how aperture of each of truncated catadioptric telescope 300, in a plurality thereof, are arranged in array 500 to best cover the field-of-view, as per the discussion with respect to FIGS. 6A and 6B. Each aperture 730, which appears as a semicircle, is oriented so that the rounded side of each aperture faces away from the center of the field-of-view. That is, the oppositely inclined field points toward the center of the image. As a result, overlap regions between telescopes are more likely to be better imaged by the telescope further from the center of the array, where the fields are oppositely inclined to the telescope axis.

The bokeh of the annular or semiannular aperture has a radius on the focal plane that increases with defocus. This bokeh is useful for both finding the correct focus position in an object, as well as estimating the three-dimensional position of an object in the scene. This is particularly useful when tracking multiple targets, such as the headlights of cars or temporary glint points from moving objects. The three-dimensional path of objects through space can thus be determined in a moving scene.

In an alternative embodiment, rather than tilting the telescope to cover larger portions of the field, a kinoform may be used to tilt the beam. In some embodiments, such as the illustrative embodiment depicted in FIG. 8, kinoform 840 is patterned on front flat surface 104 of front optical element 102.

Figure 8:
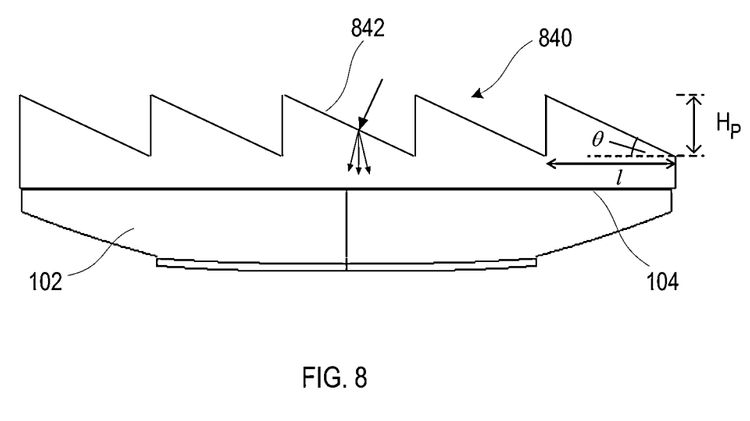
FIG. 8 depicts an embodiment of a kinoform for use with a truncated catadioptric telescope in accordance with the present teachings.

Kinoform 840 comprises a periodic array of prisms 842 of refractive index n, with n usually being the same refractive index of the substrate (i.e., front optical element 102).

Figure 9:
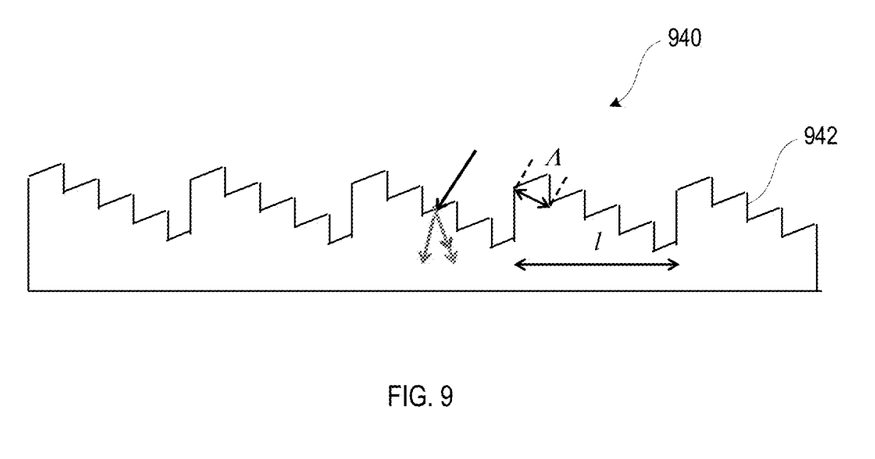
FIG. 9 depicts an alternative embodiment of a kinoform for use with a truncated catadioptric telescope in accordance with the present teachings, wherein the kinoform includes diffractive-achromatized prisms.

Kinoform prisms 842 have a height $H_P = l \sin \theta$ and deviate the light beam by a deviation angle $= \theta(n-1)$ in radians (in the small angle approximation). Because refractive index n depends on wavelength $\lambda$, the deviation angle also depends on the wavelength, and the image is blurred. To minimize this effect, in some embodiments, each of prisms 842 in kinoform 840 is achromatized by superimposing a diffraction grating on each prism to set the deviation the same at two wavelengths $\lambda_F$ and $\lambda_C$ while achieving a nominal deviation $\alpha$ at wavelength $\lambda_D$. Kinoform 940 including diffractive-achromatized prisms 942 is depicted in FIG. 9. Typically, wavelengths $\lambda_F$, $\lambda_C$, and $\lambda_D$ are the common Abbe-defined wavelengths 486, 656, and 587 nm. Solving for the period $\Lambda$ of the grating in the small angle approximation (large period):

$$\alpha = \theta(n_D - 1) + \frac{\lambda_D}{\Lambda}$$

$$\theta(n_F - 1) + \frac{\lambda_F}{\Lambda} = \theta(n_C - 1) + \frac{\lambda_C}{\Lambda}$$

$$\frac{\alpha - \frac{\lambda_D}{\Lambda}}{n_D - 1} = \theta$$

-continued $$\left(\alpha - \frac{\lambda_D}{\Lambda}\right)\frac{n_F - n_C}{n_D - 1} = \frac{\lambda_C - \lambda_F}{\Lambda}$$

$$\alpha - \frac{\lambda_D}{\Lambda} = V_D \frac{\lambda_C - \lambda_F}{\Lambda}$$

$$\Lambda = \frac{V_D(\lambda_C - \lambda_F) + \lambda_D}{\alpha}$$

As an example of a design for kinoform 940, for plastic E48R ($n_d$=1.531, $V_d$=56.04), $\Lambda\alpha$=0.0101 mm radians, so that for 6 degrees (0.104 radians), the period $\Lambda$=0.0971 mm and $\theta$=10.6 degrees. The exact solution requires the non-paraxial solution, which can be found using a ray-tracing program.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising an array of catadioptric telescopes, the system having a system optical axis, wherein:
   (a) at least some of the telescopes in the array are truncated; and
   (b) an optical axis of at least some of the telescopes in the array are tilted with respect to the system optical axis.

2. The system of claim 1 wherein the catadioptric telescopes consists essentially of seven optical surfaces.

3. The system of claim 1 wherein the catadioptric telescope is a Schmidt-Cassegrain telescope.

4. The system of claim 1 wherein the catadioptric telescopes comprises a front optical element and a rear optical element.

5. The system of claim 4 wherein the front optical element consists essentially of three optical surfaces and the rear optical element consists essentially of four optical surfaces.

6. The system of claim 4 wherein the front optical element is a Schmidt corrector and the rear optical element comprises a Mangin mirror and a field flattener.

7. The system of claim 4 wherein a back side of the front optical element consists essentially of an annular optical surface and a center circular optical surface disposed within the annular optical surface, wherein the center circular optical surface is a mirror.

8. The system of claim 4 wherein a front side and a back side of the rear optical element each consist essentially of an annular optical surface and a center circular optical surface disposed within the annular optical surface.

9. The system of claim 4 wherein the front optical element and the rear optical element comprise the same material.

10. The system of claim 1 wherein a field-of-view of each catadioptric telescope in the array overlaps a field-of-view of at least three other catadioptric telescopes in the array.

11. The system of claim 1 wherein all telescopes in the array are truncated, each telescope having an aperture with a rounded side and a flat side as a consequence of the truncation, wherein the aperture of each telescope is oriented so that the rounded side thereof faces away from a center of a field-of-view of the array.

12. The system of claim 1 wherein an optical axis of all telescopes in the array are tilted with respect to the system optical axis.

13. The system of claim 1 wherein each telescope in the array provides a field-of-view of 24 degrees and wherein spacing between centers of each telescope is 18 degrees.

14. The system of claim 1 wherein each telescope in the array is a compact telescope.

15. The system of claim 1 wherein the system comprises a camera system for a mobile device, wherein the camera system includes:
   an array of micro-cameras, each micro-camera comprising one of the catadioptric telescopes and a focal plane array, wherein light within a field-of-view of each micro-camera is propagated to the micro-camera's focal plane array, the light defining an optical sub-image, and wherein the focal plane array generates a digital sub-image from the optical sub-image.

16. The system of claim 15 wherein at least some of the micro-cameras have at least one controllable setting that is independently and dynamically adjustable, wherein the controllable setting is selected from the group consisting of focus, exposure, gain, magnification, and dynamic range.

17. A system comprising an array of catadioptric telescopes, the system having a system optical axis, wherein:
   (a) each catadioptric telescope comprises:
      (i) a front optical element comprising an aspheric lens; and
      (ii) a rear optical element comprising an outer annular portion and an inner circular portion, wherein the outer annular portion is a negative meniscus lens and the inner circular portion is a field flattener;
   (b) at least some of the catadioptric telescopes are truncated; and
   (c) the catadioptric telescopes are oriented so that neighboring catadioptric telescopes have overlapping fields-of-view.

18. The system of claim 17 wherein an optical axis of at least some of the catadioptric telescopes are tilted with respect to the system optical axis, and wherein at least some of catadioptric telescopes are tilted by a different amount than other catadioptric telescopes in the array.

19. The system of claim 17 wherein a kinoform is disposed on a front surface of the front optical element of at least some of the catadioptric telescopes in the array.

20. A system comprising an array of compact catadioptric telescopes, the system having a system optical axis, wherein:
   (a) each catadioptric telescope in the array comprises:
      (i) a front optical element having a front and back and a rear optical element having a front and a back, the front being closer to an object being imaged;
      (ii) the front of the front optical element comprising a planar surface and the back of the front optical element comprising an positive refractive lens in a first annular region and a mirror in a central circular region within the first annular region;
      (iii) the front of the rear optical element comprising a negative meniscus lens in an second annular region and a first surface of a field flattening lens in a central circular region within the second annular region;
      (iv) the back of the rear optical element comprising a primary mirror in a third annular region and a second surfaced of the field flattening lens in a central circular region within the third annular region;
   (b) at least some of the catadioptric telescopes are truncated;
   (c) an optical axis of at least some of the catadioptric telescopes in the array are tilted with respect to the system optical axis.

21. The system of claim 20 wherein, truncated catadioptric telescopes have removed portions of the front optical element and rear optical element that are bounded by a plane intersecting the front and rear optical elements but not intersection the image formed by truncated catadioptric telescope, wherein portions not removed are on a side of the plane containing the image formed by the truncated catadioptric telescope.

* * * * *